United States Patent [19]
Weir, III

[11] Patent Number: 6,017,097
[45] Date of Patent: Jan. 25, 2000

[54] WHEEL HUB ASSEMBLY

[76] Inventor: Robert Spence Weir, III, 1533 Rio Grande, American Canyon, Calif. 94589

[21] Appl. No.: 08/999,048

[22] Filed: Dec. 29, 1997

[51] Int. Cl.$^7$ ..................................................... B60B 27/00
[52] U.S. Cl. ........................ 301/105.1; 301/111; 301/137; 384/589
[58] Field of Search ............................. 301/105.1, 124.1, 301/111, 137, 131, 6.91, 35.62; 384/544, 589, 585

[56] References Cited

U.S. PATENT DOCUMENTS

| | | | |
|---|---|---|---|
| 1,133,813 | 3/1915 | Marmon | 301/137 |
| 1,955,824 | 4/1934 | Mogford et al. | 301/137 |
| 4,331,210 | 5/1982 | Petrak | 301/131 |
| 4,591,212 | 5/1986 | Balken et al. | 301/105.1 |
| 4,881,842 | 11/1989 | Farrell et al. | 301/124 |
| 4,986,608 | 1/1991 | Fett | 301/124 |
| 5,032,029 | 7/1991 | Pratt et al. | 384/585 |
| 5,100,247 | 3/1992 | Woehler | 384/544 |
| 5,159,754 | 11/1992 | Vancsik | 29/898.07 |
| 5,259,676 | 11/1993 | Marti | 384/585 |
| 5,553,927 | 9/1996 | Mastrangelo | 301/124.1 |

*Primary Examiner*—S. Joseph Morano
*Assistant Examiner*—Long Bao Nguyen

[57] ABSTRACT

A wheel hub assembly that has a hub retained within a rotatable inner race of a bearing. The bearing is non-rotatably mounted by a portion of it's outer race within the bore of a bearing housing. This bearing housing has threaded holes on a diameter within its' face to accept bolts by attachment to an axle housing end support. Non-rotatably mounted within the bearing housing is a lip seal to prevent contaminants from entering the bearing. On the face of the hub is a groove on a diameter for accepting an o-ring sealing member to furnish a barrier between the face of the hub and the drive axle preventing loss of differential lubrication. Bolts are threaded through the hub on a diameter within its face for securing a wheel and engaging a drive axle, whereby the support of the wheel is not dependent upon the drive axle.

4 Claims, 3 Drawing Sheets

WHEEL HUB ASSEMBLY

BACKGROUND OF INVENTION

1. Field of the Invention

This invention relates to the field of miniature automobile racing and specifically the need for a drivable wheel hub assembly, capable of supporting the driven wheels, independent of the drive axle.

2. Description of the Related Art

Miniature race cars such as what is known as a Dwarf Car and Legends race cars use a rigid or non-independent rear drive axle system. The most commonly used rear drive axle system for these cars is called a Toyota "ten bolt." This drive axle system is common in a variety of small passenger cars produced by Toyota. It is modified for use in miniature race cars by moving the differential over to the right side of the car. This is done to facilitate coupling of the differential to the engine. The Toyota rear drive axle is chosen because of its compact size and light weight making it compatible within the confines of the miniature race cars chassis configuration. It is also in abundant supply at automotive salvage yards keeping costs affordable.

The problem with this type of drive axle system is that the drive axle functions as the rotating support for the wheel and also transmits rotational energy from the differential to the wheel. This makes it possible for the drive wheels to escape from the car if drive axle failure occurs during vehicle operation. Another disadvantage with this system is by its design it takes a significant amount of time to remove the drive axles from the axle housing. This is undesirable because the differential gears are changed frequently for different sized race tracks and the drive axles have to be removed each time to change them.

Solving this problem has previously been approached by utilizing what is known as a "full floating axle assembly." For example, U.S. Pat. No. 4,351,407 to Call (1982) discloses such an assembly which has generally been in use on large vehicles such as trucks. U.S. Pat. No. 5,197,786 to Eschenburg (1993) discloses a similar assembly designed for use in race cars. Stock Car Products Co., Inc. also manufacturesa full floating axle assembly resembling the patents mentioned above.

All of these systems are functional but fail to be widely used in miniature race cars because of a number of significant problems. One such problem with these systems is that they were primarily designed for larger sized vehicles, for instance, trucks and Nascars' Winston Cup and Grand national Series race cars. It is possible to use these systems in miniature race cars by using a larger drive axle assembly. For example, a Nissan small truck axle assembly can be modified to accept Stock Car Products full floating axle assembly and can be fitted into a miniature race car. The disadvantages of doing this is that it adds significant unwanted weight to the race car and requires specialized equipment, such as, alignment fixtures and welders to be installed. Also, there are fewer supplies of these small truck axle assemblies available through automotive salvage yards. Accordingly, these disadvantages increase the expenses involved with applying these systems to miniature race cars.

SUMMARY OF THE INVENTION

The present invention is a hub assembly for a drivable wheel of a vehicle. It is comprised of a hub rotatably supported by a bearing that is non-rotatably supported within a bearing housing. This bearing housing attaches to an end support of an axle housing replacing the original equipment drive axle and bearing. By the design of the hub assembly, it is installed without altering the end support of the axle housing. The hub assembly provides rotational support of the wheel independent of the drive axle.

OBJECTS AND ADVANTAGES

Accordingly, several objects and advantages of my invention are:

(a) to provide a bolt on drivable wheel hub assembly capable of being used on miniature race cars;

(b) to provide a bolt on drivable wheel hub assembly capable of rotatably supporting the driven wheels independent of the drive axles;

(c) to provide a bolt on drivable wheel hub assembly designed to permit quick removal of the drive axles;

(d) to provide a bolt on drivable wheel hub assembly capable of being installed to the Toyota rear drive axle system without having to modify the Toyota housing;

(e) to provide a bolt on drivable wheel hub assembly that does not require specialized equipment to be installed;

(f) to provide a bolt on drivable wheel hub assembly which replaces the original equipment drive axle and drive axle bearing within the confines of the same physical space;

(g) to provide a bolt on drivable wheel hub assembly capable of rotatably supporting the driven wheels even if axle failure occurs;

(h) to provide a bolt on drivable wheel hub assembly where the bearing of the assembly is isolated from outside contaminant and the differential lubrication;

further objects and advantages are to provide a bolt on drivable wheel hub assembly that is easy to install, simple in design, simple to use, inexpensive to use and will directly fit the Toyota "ten bolt" rear drive axle system. Still further objects and advantages of my invention will become apparent from a consideration of the drawings and following description.

REFERENCE NUMERALS IN DRAWINGS

| | | | |
|---|---|---|---|
| 10 | hub | | |
| 11 | bering housing | 19 | hub bolts |
| 12 | double row angular contact roller bearing | 20 | end support of axle housing |
| | | 21 | housing bolts |
| 13 | steel retaining sleeve | 22 | original equipment drive axle |
| 14 | retaining ring | 23 | original equipment drive axle bearing |
| 15 | drive axle shaft | 24 | original equipment lip seal |
| 16 | drive axle flange | 25 | original equipment retaining sleeve |
| 17 | "o" ring groove | 26 | original equipment axle retainer |
| 18 | lip seal | | |

DESCRIPTION OF THE PREFERRED EMBODIMENTS

Figure 1:
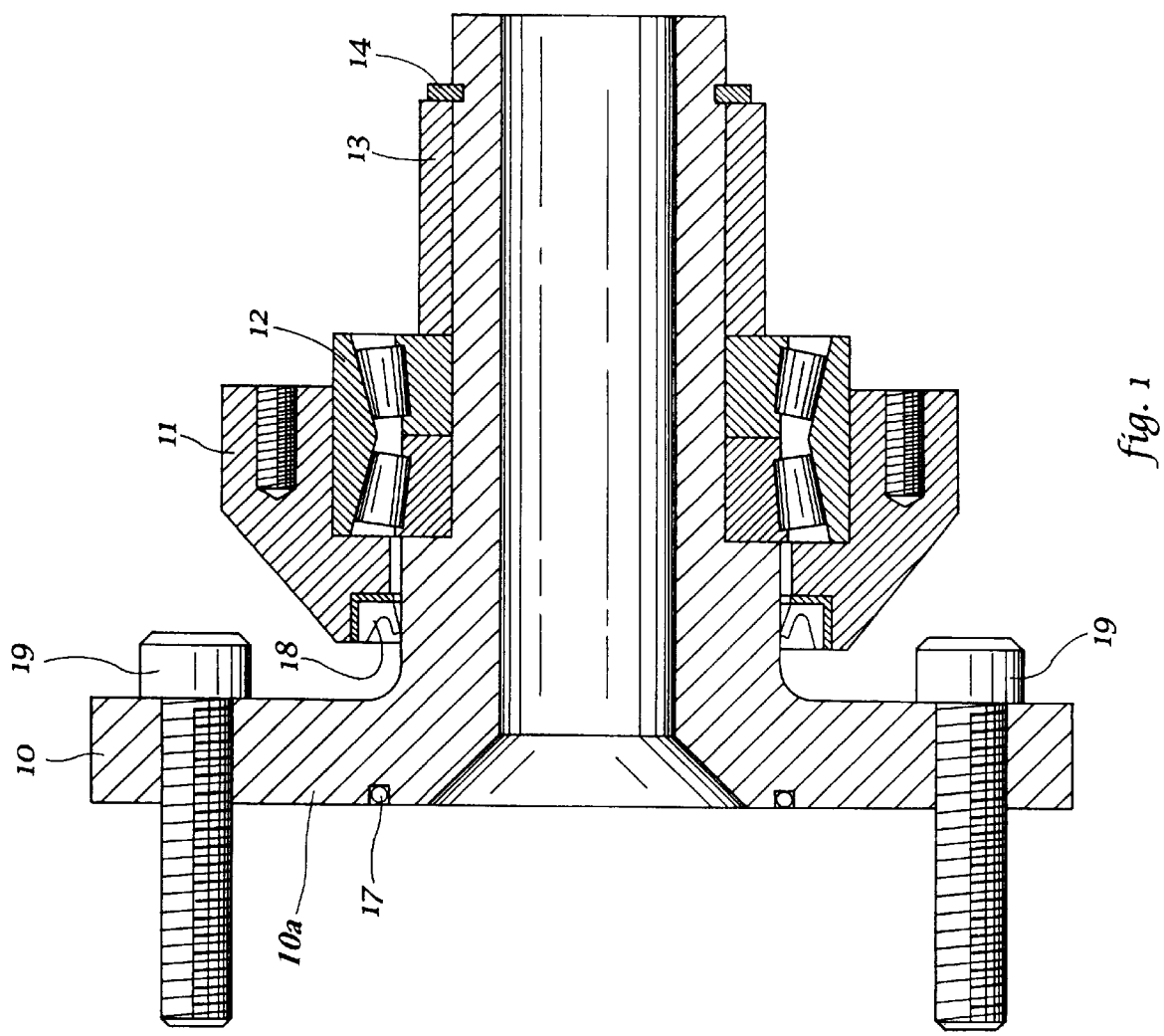
FIG. 1 shows a cross sectional side view of a preferred embodiment of my invention.

A typical embodiment of the bolt on drivable wheel hub assembly of the present invention is illustrated in FIG. 1

Figure 3:
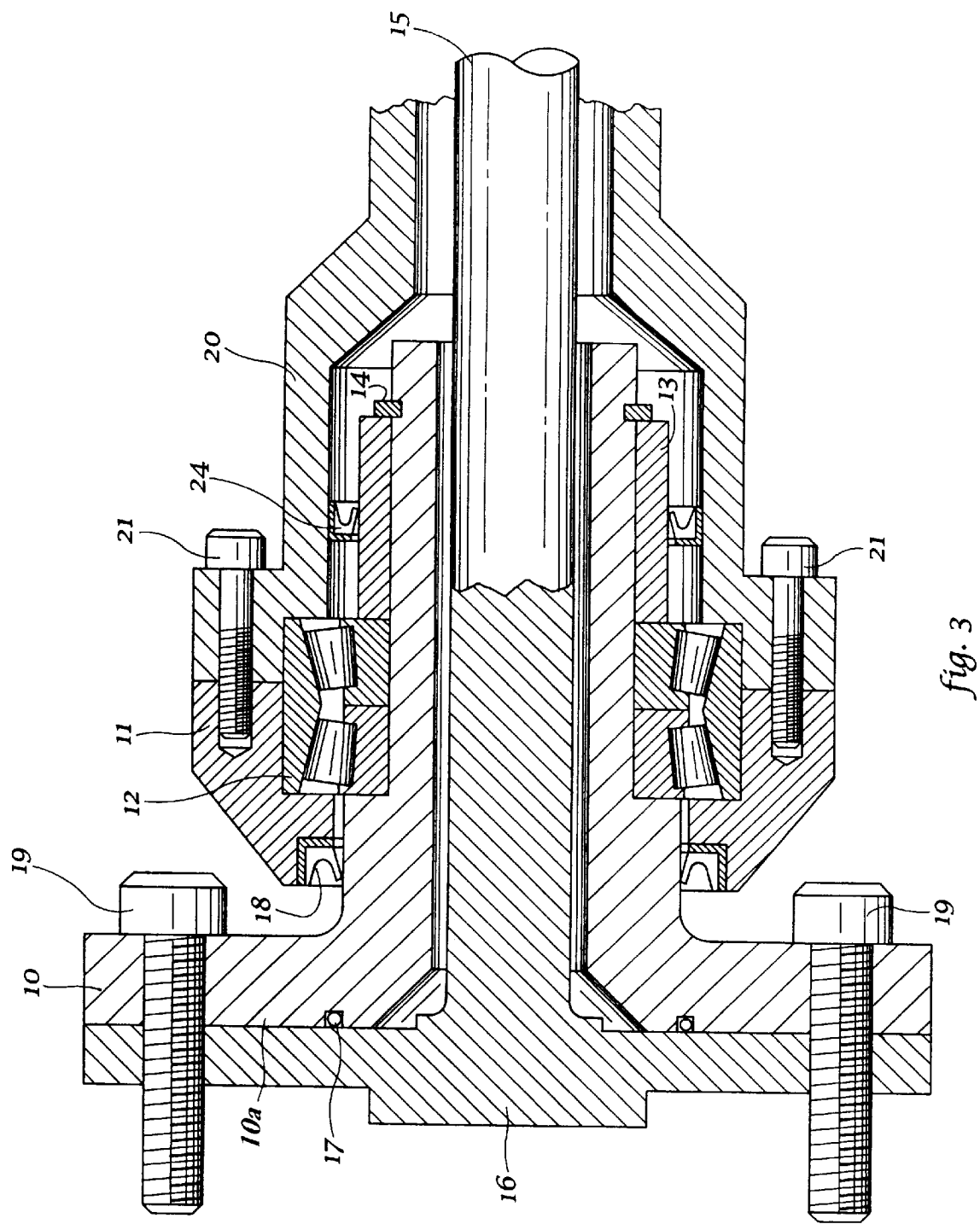
FIG. 3 shows a cross sectional side view of a preferred embodiment of my invention installed in the end support of a prior art axle housing.

(side view) and FIG. 3 (side view as installed to end support of axle housing). Referring to FIG. 1 the present invention is shown having a steel hub 10 with hub plate 10a, having radially extending faces and a central bore. The hub 10 is rotatably supported within an inner race of a double row, angular contact, roller bearing 12. A steel retaining sleeve 13 is press fitted to the hub 10 against the inner race of the bearing 12. This provides a safeguard against escape of the hub 10 from within the inner race of the bearing 12. A retaining ring 14 is fitted to a groove on the hub 10 located directly at the end of the steel retaining sleeve 13 providing additional retaining means. An aluminum bearing housing 11 non rotatably supports a portion of the outer race of the bearing 12. The bearing housing 11 having a plurality of threaded holes, on a diameter, within its face, provides a means of attachment to an end support of an axle housing 20 FIG. 3. A lip seal 18 is non rotatably mounted within the bearing housing 11 outboard of the bearing 12 that seals against the hub 10 providing protection from contaminants entering the bearing housing 11. On the face of the hub 10 is a groove 17 provided to accept an "o" ring sealing member. Hub bolts 19 thread through a plurality of threaded holes on a diameter within the hub plate 10a.

OPERATION OF INVENTION FIGS. 1, 2, 3

Figure 2:
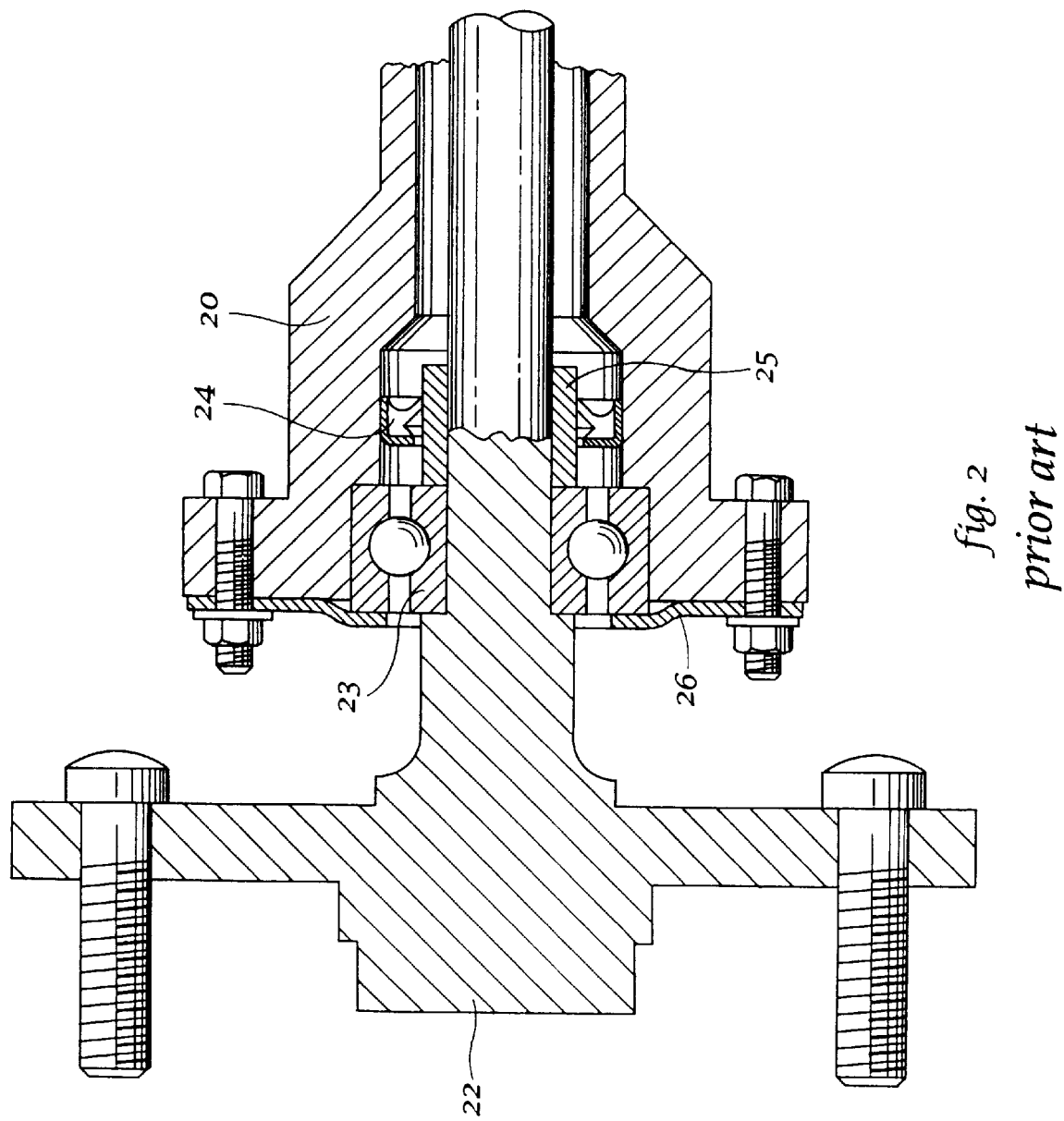
FIG. 2 is a cross sectional side view of a prior art rear drive axle assembly typical of what is used in miniature race cars.

The bolt on drivable wheel hub assembly as shown in FIG. 1 is designed to replace an original equipment drive axle 22, an original equipment drive axle bearing 23 and an original equipment drive axle retainer 26 as shown in FIG. 2. It can be seen that the bolt on drivable wheel hub assembly as shown in FIG. 3 is attached to an end support of an axle housing 20. To install the bolt on drivable wheel hub assembly (FIG. 1) the original equipment drive axle 22 and its related parts 23, 25, and 26 as shown in FIG. 2 must be removed from the end support 20. The hub assembly (FIG. 1) is then placed in position by inserting the portion of the bearing 12 remaining outside of the bearing housing 11 into the end support 20. The bearing 12 has an outer diameter matching that of the original equipment drive axle bearing 23 thereby fitting into the existing bore of the end support 20. The bearing housing 11 is secured to the end support 20 by a plurality of housing bolts 21 which pass through the end support 20 and thread into the bearing housing 11. This has the effect of aligning and clamping the bearing 12 within the end support 20 and bearing housing 11, thereby non-rotatably supporting the bearing 12 by its outer race. The bearing 12 provides the rotating support for the hub 10 which is rotatably secured within the inner race of the bearing 12. This allows the hub 10 to be rotated within the end support 20 and the bearing housing 11. The hub 10 is retained within the bearing 12 by a press on steel retaining sleeve 13 having a predetermined bore that provides an interference fit to the hub 10. At the end of the steel retaining sleeve opposite the bearing is a retaining ring 14 fitted within a groove on the hub 10 providing additional retaining means. The steel retaining sleeve 13 has an outer diameter equal to that of an original equipment retaining sleeve 25. This allows the original equipment lip seal 24 to seal against its diameter, preventing differential lubrication from entering the bearing 12. The bearing housing 11 also has a lip seal 18 non-rotatably mounted outboard of the bearing 12 that seals against the hub 10 to prevent outside contaminants from entering the bearing 12. This allows the bearing 12 and its lubrication to be secluded.

FIG. 3 shows the hub assembly attached to the end support 20 of a typical axle housing. It also shows a drive axle 15 and drive axle flange 16 in relation to the hub assembly. The drive axle shaft 15 and axle flange 16 that is generally depicted in FIG. 3 is, with the exception of the present invention, well known in the prior art. The drive axle flange 16 is secured to the hub plate 10a by a plurality of hub bolts 19 that are threaded through the radially extending faces of the hub plate 10a. The hub bolts 19 pass through a matching plurality of holes in the drive axle flange 16. The bolts 19 then pass through receiving holes in a wheel onto which nuts are threaded, thereby, clamping the wheel and drive axle flange 16 to the hub plate 10a. The drive axle shaft 15 transmits rotational energy received by a differential, from the vehicles engine, through the central bore of the hub plate 10a to the drive axle flange 16 which is sandwiched between the wheel and the hub 10. Thus the rotational energy is transferred simultaneously from the drive axle flange 16, to the hub plate 10a, to the wheel and ultimately to the tire. Thus, it can be seen that if a drive axle shaft 15 failure occurs the hub 10 will still be able to rotatably support the wheel.

CONCLUSION RAMIFICATIONS AND SCOPE

Accordingly, the reader will see that the bolt on drivable wheel hub of this invention provides a highly reliable, economical, safe, user friendly device used to support the driven wheels of a vehicle independent of the drive axles.

While the above description includes many specifications, these should not be understood as limitations on the scope of the invention but as an example of one preferred embodiment thereof. A number of other variations of the hub assembly are possible. For example, the central bore of the hub can be splined to mate with a drive axle having a splined end to transmit rotational energy to the hub. Also a drive flange having a splined bore can be attached to the face of the hub to receive an axle having a splined end transferring rotational energy to the hub assembly. Furthermore, the hub can be threaded inboard of the bearing, opposite the bearing housing, allowing a retaining sleeve with a threaded bore to be tightened against the bearing retaining the hub within the bearing. Various bearing types can also be utilized as well as other methods of aligning the hub assembly to the end support. For example, a ball bearing can be used and aligned to the end support by a shoulder machined on the face of the bearing housing, parallel to its bore, extending into the bore of the end support. Other materials can also be utilized in the construction of the hub assembly such as, aluminum, titanium, magnesium and other lightweight metal alloys. Consequently, the described invention is not limited to use on miniature race cars. The dimensions of the invention can be varied to facilitate its use on larger vehicles and other rear drive axle assemblies.

Accordingly, the scope of the invention should be determined not by the embodiments depicted but by the appended claims and their legal equivalents.

I claim:

1. A wheel hub assembly for vehicles comprising:

an elongated tubular axle housing;

a driven axle having a shaft portion and an outer end;

said shaft portion of said driven axle extending through said elongated tubular axle housing;

said outer end of said driven axle having an axle flange formed thereon;

a hub comprising an axially extending hub body and axially extending bore therethrough and a hub plate having an outer face and an inner face;

said hub plate connected to said axle flange for driven rotation therewith;

said hub plate and said axle flange each having a plurality of threaded holes extending therethrough to receive wheel fixing bolts;

said outer face of said hub plate having an annular groove;

and an o-ring sealing member disposed in said groove between said axle flange and said hub plate.

2. The wheel hub assembly of claim 1 further comprising a bearing housing having an outer face and a plurality of threaded holes extending therethrough;

said outer face of bearing housing mates to an end support of said axle housing by a fastening means through said threaded holes on said bearing housing.

3. The wheel hub assembly of claim 1 further comprising a retaining sleeve disposed on said hub body within said axle housing and a seal disposed between said axle housing and said retaining sleeve.

4. The wheel hub assembly of claim 1 further comprising a bearing assembly disposed between said axle housing and said axially extending hub body.

* * * * *